(12) United States Patent
Chang et al.

(10) Patent No.: US 10,052,860 B2
(45) Date of Patent: Aug. 21, 2018

(54) PRINTING-HEIGHT INCREASABLE THREE-DIMENSIONAL PRINTER

(71) Applicants: Inventec Appliances (Pudong) Corporation, Shanghai (CN); Inventec Appliances (Shanghai) Co., Ltd., Shanghai (CN); Inventec Appliances Corp., New Taipei (TW)

(72) Inventors: Jing-Song Chang, New Taipei (TW); Shen Zhang, Shanghai (CN); Steven Tseng, New Taipei (TW)

(73) Assignees: Inventec Appliances (Pudong) Corporation, Shanghai (CN); Inventec Appliances (Shanghai) Co., Ltd., Shanghai (CN); Inventec Appliances Corp., New Taipei (TW)

( * ) Notice: Subject to any disclaimer, the term of this patent is extended or adjusted under 35 U.S.C. 154(b) by 399 days.

(21) Appl. No.: 14/876,822

(22) Filed: Oct. 7, 2015

(65) Prior Publication Data

US 2016/0297151 A1  Oct. 13, 2016

(30) Foreign Application Priority Data

Apr. 9, 2015  (CN) .................... 2015 2 0211647 U

(51) Int. Cl.
*B33Y 30/00* (2015.01)
*B29C 64/106* (2017.01)
*B29L 31/00* (2006.01)

(52) U.S. Cl.
CPC ............ *B33Y 30/00* (2014.12); *B29C 64/106* (2017.08); *B29L 2031/772* (2013.01)

(58) Field of Classification Search
CPC ............................. B33Y 30/00; B29C 64/106

USPC .......................................... 264/308; 425/375
See application file for complete search history.

(56) References Cited

U.S. PATENT DOCUMENTS

| | | | |
|---|---|---|---|
| 6,722,872 B1 * | 4/2004 | Swanson ................. | B29C 41/36 425/225 |
| 8,153,183 B2 * | 4/2012 | Skubic .................. | B33Y 30/00 118/300 |
| 9,233,507 B2 * | 1/2016 | Bibas .................. | B29C 67/0088 |
| 9,398,675 B2 * | 7/2016 | Eaves .................. | A61B 6/4233 |
| 2012/0291701 A1 * | 11/2012 | Grasegger ........... | B29C 67/0085 118/300 |
| 2016/0052207 A1 * | 2/2016 | Bloom ................ | B29C 67/0085 425/3 |

* cited by examiner

*Primary Examiner* — Matthew J Daniels
*Assistant Examiner* — Hana C Page
(74) *Attorney, Agent, or Firm* — CKC & Partners Co., Ltd.

(57) ABSTRACT

A printing-height increasable three-dimensional printer includes a base, an elevating shaft, an elevating platform, a first driving module, a working platform, a printing nozzle, and a second driving module. The elevating shaft is connected to the base. The elevating platform is slidably connected to the base. The first driving module is configured to drive the elevating shaft to make the base move along a direction, and is configured to drive the elevating platform to reversely move relative to the base along the direction. The working platform is slidably connected to the elevating platform. The printing nozzle is connected to the base and is configured to print on the working platform. The second driving module is configured to drive the working platform to move between the printing nozzle and the elevating platform.

10 Claims, 2 Drawing Sheets

PRINTING-HEIGHT INCREASABLE THREE-DIMENSIONAL PRINTER

RELATED APPLICATIONS

This application claims priority to Chinese Application Serial Number 201520211647.9, filed Apr. 9, 2015, which is herein incorporated by reference.

BACKGROUND

Technical Field

The present disclosure relates to a three-dimensional printer.

Description of Related Art

RP (Rapid prototyping) technology is a technology highly valued by the industry after the CNC machining technology. RP technology can rapidly produce a prototype based on a 3D object model designed by CAD (Computer-aided design) by using a three-dimensional printing mechanism without substantial cost. The principle of the RP technology is to slice the 3D object model of CAD into multiple slices, and after the sectional configuration information of the slices is processed and transferred, the object to be formed is stacked layer-by-layer using the three-dimensional printing mechanism based on the sectional configuration information. Therefore, RP technology has great potential for development.

At present, the printing head structure of a three-dimensional printer mainly includes a feed inlet, a feed motor, a guide tube, a heating element, and a nozzle. The majority of the raw materials used are thermoplastic molding materials. The raw materials are solid at room temperature. The solid raw materials are pushed through the feed inlet to the heating element via the guide tube by the feed motor, and the solid raw materials are melted by the heating element and then are gradually stacked into the object to be formed by the nozzle.

In general, when carrying out the three-dimensional printing, the scale in the vertical direction is more important than the scale in the horizontal directions. However, due to the height of conventional three-dimensional printers, a variety of Cartesian structures (with the nozzle moving in the X and Y axes and the working platform moving in the Z axis) or parallel arm structures (mapping the XYZ coordinates to three moving shafts perpendicular to each other by trigonometric functions) are required, but the effective print heights are typically too small. In addition, conventional three-dimensional printers cannot exceed the height limitations during the three-dimensional printing.

SUMMARY

In order to solve the foregoing problem, the disclosure provides an adjustable printing-height three-dimensional printer.

According to an embodiment, the disclosure provides an adjustable printing-height three-dimensional printer. The adjustable printing-height three-dimensional printer includes a base, an elevating platform, a working platform, a printing nozzle, an elevating shaft, a first driving module, and a second driving module. The elevating platform is disposed on the base and configured to be movable towards or away from the base. The working platform is disposed on the elevating platform and configured to be movable towards or away from the elevating platform. The printing nozzle is located above the working platform and configured to print on the working platform. The elevating shaft is connected to the base. The first driving module is operably engaged with the elevating shaft and the elevating platform. The first driving module is configured to drive the elevating shaft to move the base along a first axial direction, and further configured to drive the elevating platform to move relative to the base along the first axial direction. The second driving module is connected to the elevating platform and operably engaged with the working platform. The second driving module is configured to move the working platform between the printing nozzle and the elevating platform.

In an embodiment of the disclosure, the elevating shaft includes a plurality of sequentially sleeved bushings. The bushings are configured to extend or retract along the first axial direction. The first driving module is connected to the base and configured to drive the bushings to extend or retract.

In an embodiment of the disclosure, the first driving module is connected to the base and includes a first sleeve, a first guide rod, and a driver. The first sleeve is disposed on the base. The first guide rod is operably engaged with the elevating platform and slidably sleeved by the first sleeve. The first guide rod extends along the first axial direction. The driver is disposed on the base and configured to drive the first guide rod to move relative to the first sleeve.

In an embodiment of the disclosure, the second driving module includes a second sleeve, a second guide rod, a screw, and a first motor. The second sleeve is disposed on the working platform. The second guide rod is connected to the elevating platform and slidably sleeved by the second sleeve. The second guide rod extends along the first axial direction. The screw rod is disposed on the elevating platform and configured in a screw arrangement with the working platform. The first motor is disposed on the elevating platform and configured to drive the screw rod to rotate, so as to move the working platform relative to the elevating platform along the first axial direction.

In an embodiment of the disclosure, the adjustable printing-height three-dimensional printer further includes a two-dimensional moving module. The two-dimensional moving module is connected to the printing nozzle and configured to move the printing nozzle above the base along a second axial direction and a third axial direction.

In an embodiment of the disclosure, the two-dimensional moving module includes a first rail and a second rail. The first rail extends along the second axial direction. The second rail is slidably disposed on the first rail and extends along the third axial direction. The printing nozzle is slidably disposed on the second rail.

In an embodiment of the disclosure, the two-dimensional moving module further includes a first transmission member, a second motor, a second transmission member, and a third motor. The first transmission member is operably engaged with the second rail. The second motor is disposed on the first rail and configured to drive the first transmission member to move the second rail relative to the first rail along the second axial direction. The second transmission member is operably engaged with the printing nozzle. The third motor is disposed on the second rail and configured to drive the second transmission member to move the printing nozzle relative to the second rail along the third axial direction.

In an embodiment of the disclosure, the first transmission member and the second transmission member are transmission belts.

In an embodiment of the disclosure, any two of the first axial direction, the second axial direction, and the third axial direction are perpendicular to each other.

According to another embodiment, the disclosure provides a method for adjusting printing-height of the adjustable printing-height three-dimensional printer. The method includes: driving the elevating shaft to move the base along the first axial direction for a predetermined distance; and simultaneously driving the elevating platform to move in an opposite direction to the base movement along the first axial direction for the predetermined distance.

Accordingly, the adjustable printing-height three-dimensional printer of the disclosure can adjust the printable height range thereof according to actual heights of objects to be printed. When there is no object to be printed or the height of the object to be printed is small, the adjustable printing-height three-dimensional printer of the disclosure can be switched to a retracted form, so that the adjustable printing-height three-dimensional printer occupies less space. If the height of the object to be printed is large, the adjustable printing-height three-dimensional printer of the disclosure can be switched to an expanded form by lifting the base by the elevating shaft and lowering the elevating platform, so as to increase the movable height range of the working platform between the elevating platform and the printing nozzle.

It is to be understood that both the foregoing general description and the following detailed description are by examples, and are intended to provide further explanation of the disclosure as claimed.

DETAILED DESCRIPTION

Figure 1:
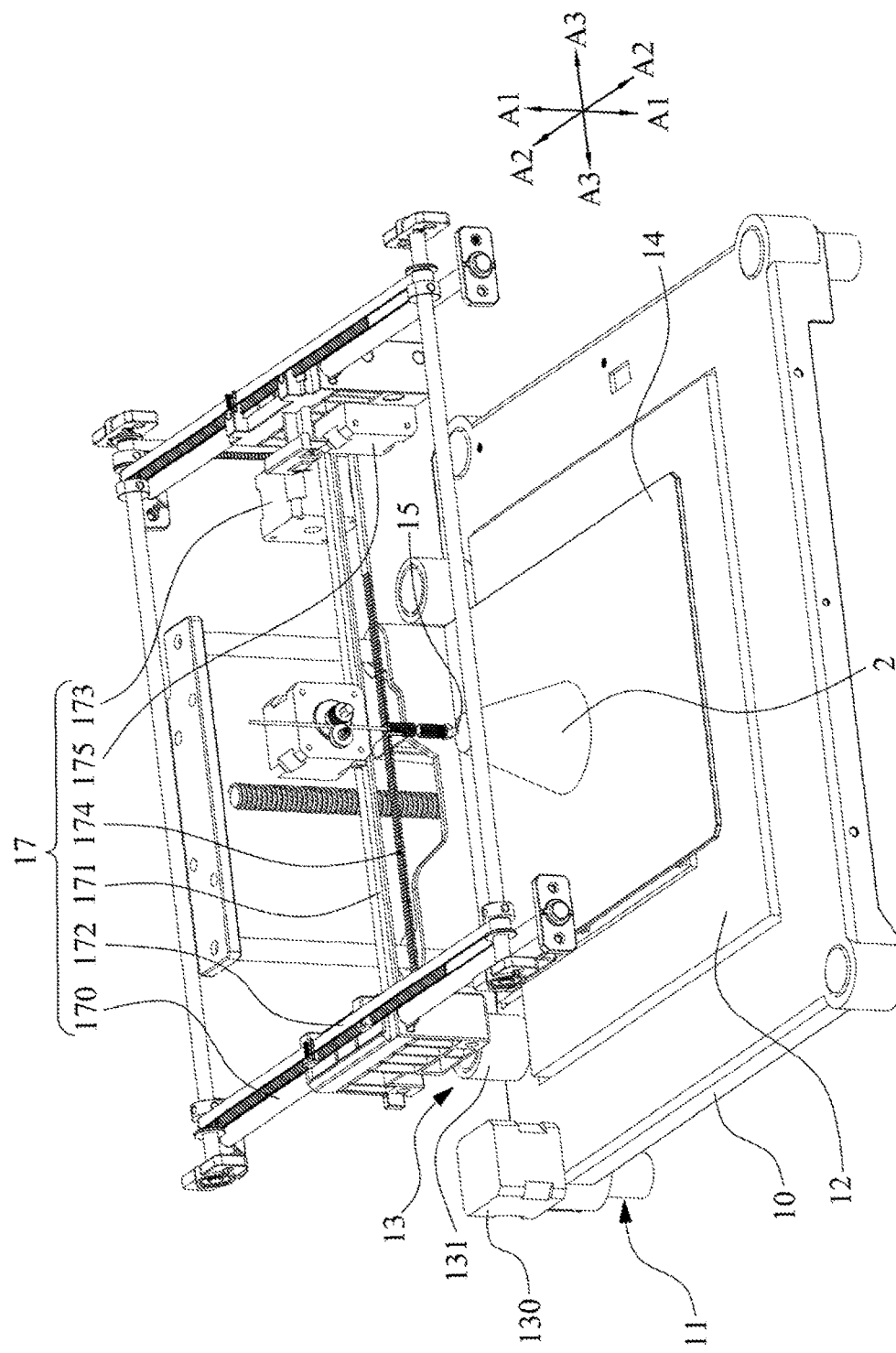
FIG. 1 is a perspective view of an adjustable printing-height three-dimensional printer according to an embodiment of the disclosure, in which the adjustable printing-height three-dimensional printer is in a retracted configuration.

Reference will now be made in detail to the present embodiments of the disclosure, examples of which are illustrated in the accompanying drawings. Wherever possible, the same reference numbers are used in the drawings and the description to refer to the same or like parts.

Figure 2:
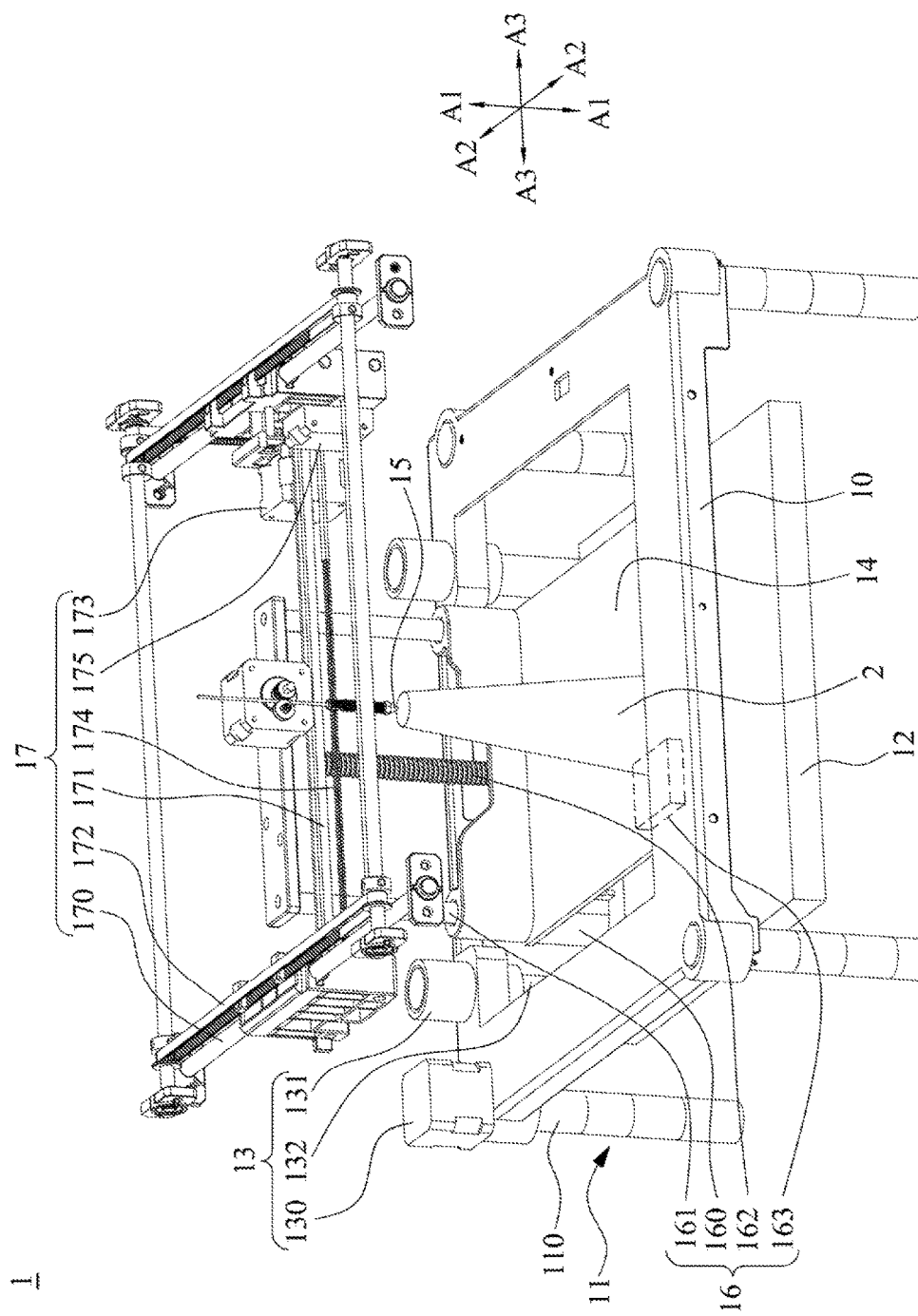
FIG. 2 is a perspective view of the adjustable printing-height three-dimensional printer in FIG. 1, in which the adjustable printing-height three-dimensional printer is in an expanded configuration.

As shown in FIG. 1 and FIG. 2, in the embodiment, the adjustable printing-height three-dimensional printer 1 includes a base 10, an elevating shaft 11 an elevating platform 12, a first driving module 13, a working platform 14, a printing nozzle 15, and a second driving module 16. The elevating shaft 11 is connected to the base 10 and supports the base 10. The first driving module 13 engages with the elevating shaft 11 and is configured to drive the elevating shaft 11, making the base 10 able to move along a first axial direction A1 (e.g., moving upwardly as illustrated in FIG. 2 relative to FIG. 1). The elevating platform 12 is located within the base 10 and movable along the first axial direction A1 relative to the base 10 (e.g., moving downwardly as illustrated in FIG. 2 relative to FIG. 1). The first driving module 13 engages with the elevating platform 12 and drives this movement. The working platform 14 is disposed on the elevating platform 12 and configured to move in the first axial direction A1 relative to the elevating platform 12. The printing nozzle 15 is located above the working platform 14 and configured to print on the working platform 14. The second driving module 16 engages with the working platform 14 and is configured to drive the working platform 14 to move between the printing nozzle 15 and the elevating platform 12.

As shown in the Figures, the elevating shaft 11 includes a plurality of bushings 110. The bushings 110 are sequentially sleeved and able to extend or retract along the first axial direction A1. The first driving module 13 includes a driver 130 disposed on the base 10 and configured to drive the bushings 110 to extend or retract. As shown in FIG. 1, when the driver 130 of the first driving module 13 drives the bushings 110 to retract, the base 10 of the adjustable printing-height three-dimensional printer 1 is moved to its lowest position. Alternatively, as shown in FIG. 2, when the driver 130 of the first driving module 13 drives the bushings 110 to extend, the base 10 of the adjustable printing-height three-dimensional printer 1 is moved to its highest position.

In the embodiment, the adjustable printing-height three-dimensional printer 1 includes four elevating shafts 11, and the driver 130 of the first driving module 13 only drives one of the elevating shafts 11 to lift or lower the base 10. The disclosure is not limited in this regard, for example it is envisaged in some embodiments that the adjustable printing-height three-dimensional printer 1 can include four drivers 130 for respectively driving the four different elevating shafts 11, which can better maintain the horizontal level of the base 10 when lifting or lowering.

As shown in FIG. 2, the first driving module 13 further includes a first sleeve 131 slidably engaged to a first guide rod 132. The first sleeve 131 is disposed on the base 10 and the first guide rod 132 is connected to the elevating platform 12. The first guide rod 132 extends generally (vertically) along in the first axial direction A1. As well as driving the elevating shaft to extend or retract, the driver 130 is also configured to drive the first guide rod 132 to move vertically in the first axial direction A1 relative to the first sleeve 131. The number of set of the first sleeve 131 and the first guide rod 132 included in the adjustable printing-height three-dimensional printer 1 is not limited in this regard.

As shown in FIG. 2, the second driving module 16 includes a second sleeve 160, a second guide rod 161, a screw rod 162, and a first motor 163 (illustrated by the dotted line in FIG. 2). The second sleeve 160 is disposed on the working platform 14 and is slidably engaged with the second sleeve 160. The second guide rod 161 extends vertically along the first axial direction A1 and is connected to the elevating platform 12. The screw rod 162 is disposed on the elevating platform 12 and in a screw engagement arrangement with the working platform 14. The first motor 163 is disposed on the elevating platform 12 and configured to drive the screw rod 162 to rotate, so as to move the working platform 14 up or down relative to the elevating platform 12 along the first axial direction A1. The number of set of the second sleeve 160 and the second guide rod 161 included in the adjustable printing-height three-dimensional printer 1 is not limited in this regard.

The adjustable printing-height three-dimensional printer 1 further includes a two-dimensional moving module 17. The two-dimensional moving module 17 can be connected to the base 10 through the external housing (not shown) of the adjustable printing-height three-dimensional printer 1. As shown in the Figures, the printing nozzle 15 is disposed on the two-dimensional moving module 17, so as to make the printing nozzle 15 move laterally along a second axial direction A2 and a third axial direction A3. In the embodiment, any two of the first axial direction A1 the second axial direction A2, and the third axial direction A3 are perpendicular to each other, but the disclosure is not limited in this regard. In practical applications, the second direction A2 and the third direction A3 can be non-orthogonal. As long as the plane constituted by the second direction A2 and the third direction A3 is generally perpendicular to the first axial direction A1 the adjustable printing-height three-dimensional printer 1 of the disclosure can perform three-dimensional printing.

The two-dimensional moving module 17 includes a first rail 170 and a second rail 171. The first rail 170 can be connected to the base 10 through the external housing (not shown) of the adjustable printing-height three-dimensional printer 1. The first rail 170 extends along the second axial direction A2. The second rail 171 is slidably disposed on the first rail 170 and extends along the third axial direction A3. The printing nozzle 15 is slidably disposed on the second rail 171. The two-dimensional moving module 17 further includes a first transmission member 172, a second motor 173, a second transmission member 174, and a third motor 175. The first transmission member 172 is connected to the second rail 171. The second motor 173 is disposed on the first rail 170 and configured to drive the first transmission member 172 to move the second rail 171 relative to the first rail 170 along the second axial direction A2. The second transmission member 174 is connected to the printing nozzle 15. The third motor 175 is disposed on the second rail 171 and configured to drive the second transmission member 174 to move the printing nozzle 15 relative to the second rail 171 along the third axial direction A3, The first transmission member 172 and the second transmission member 174 can be transmission belts or step belts.

According to the foregoing configuration, it is clear that the adjustable printing-height three-dimensional printer 1 of the disclosure can adjust the movement of the working platform 14 relative to the printing nozzle 15 in the first axial direction A1 by driving the screw rod 162 to rotate using the first motor 163, and can respectively adjust the movements of the printing nozzle 15 in the second axial direction A2 and the third axial direction A3 by respectively using the second motor 173 and the third motor 175, so as to achieve the purpose of printing the three-dimensional object 2.

In an operating mode of an embodiment, the first driving module 13 drives the elevating shaft 11 to move the base 10 upwards a distance H along the first axial direction A1, and the first driving module 13 also drives the elevating platform 12 to move downwards relative to the base 10 along the first axial direction A1 a distance H at the same time. Therefore, the distance between the working platform 14 and the printing nozzle 15 increases by distance H, and the distance H is the increased movable height range between the elevating platform 12 and the printing nozzle 15 The adjustable printing-height three-dimensional printer 1 can also lift the working platform 14 (for example by a distance D) relative to the elevating platform 12 by driving the screw rod 162 to reduce the distance between the printing nozzle 15 and the working platform 14 by H minus D, after which the printing nozzle 15 can start to print the first layer of the object 2 on the working platform 14.

In practical applications, the first driving module 13 can simultaneously drive the elevating shaft 11 and the elevating platform 12 via transmission components such as gear sets and other mechanical arrangements commonly known to a person skilled in the art.

Accordingly, the adjustable printing-height three-dimensional printer of the disclosure can adjust the printable height range thereof according to actual heights of objects that are to be printed. When there is no object to be printed, or the height of the object to be printed is small, the adjustable printing-height three-dimensional printer of the disclosure can be configured to a retracted form, such that the adjustable printing-height three-dimensional printer occupies less space. If the height of the object to be printed is large, the adjustable printing-height three-dimensional printer of the disclosure can be reconfigured to an expanded form by lifting the base and lowering the elevating platform, so as to increase the printing height range between the elevating platform and the printing nozzle.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:

1. An adjustable printing-height three-dimensional printer, comprising:
    a base;
    an elevating platform disposed on the base and configured to be movable towards or away from the base;
    a working platform disposed on the elevating platform and configured to be movable towards or away from the elevating platform;
    a printing nozzle located above the working platform and configured to print on the working platform;
    an elevating shaft connected to the base;
    a first driving module operably engaged with the elevating shaft and the elevating platform, the first driving module being configured to drive the elevating shaft to move the base along a first axial direction, and further configured to drive the elevating platform to move relative to the base along the first axial direction; and
    a second driving module connected to the elevating platform and operably engaged with the working platform, the second driving module being configured to move the working platform between the printing nozzle and the elevating platform.

2. The adjustable printing-height three-dimensional printer of claim 1, wherein the elevating shaft comprises a plurality of sequentially sleeved bushings, the bushings being configured to extend or retract along the first axial direction, wherein the first driving module is connected to the base and configured to drive the bushings to extend or retract.

3. The adjustable printing-height three-dimensional printer of claim 1, wherein the first driving module is connected to the base and comprises:
    a first sleeve disposed on the base;
    a first guide rod operably engaged with the elevating platform and slidably sleeved by the first sleeve, wherein the first guide rod extends along the first axial direction; and
    a driver disposed on the base and configured to drive the first guide rod to move relative to the first sleeve.

4. The adjustable printing-height three-dimensional printer of claim 1, wherein the second driving module comprises:
    a second sleeve disposed on the working platform;
    a second guide rod connected to the elevating platform and slidably sleeved by the second sleeve, wherein the second guide rod extends along the first axial direction;
    a screw rod disposed on the elevating platform and configured in a screw arrangement with the working platform; and a first motor disposed on the elevating platform and configured to drive the screw rod to rotate, so as to move the working platform relative to the elevating platform along the first axial direction.

5. The adjustable printing-height three-dimensional printer of claim 1, further comprising a two-dimensional moving module connected to the printing nozzle and configured to move the printing nozzle above the base along a second axial direction and a third axial direction.

6. The adjustable printing-height three-dimensional printer of claim 5, wherein the two-dimensional moving module comprises:
   a first rail extending along the second axial direction; and
   a second rail slidably disposed on the first rail and extending along the third axial direction, wherein the printing nozzle is slidably disposed on the second rail.

7. The adjustable printing-height three-dimensional printer of claim 6, wherein the two-dimensional moving module further comprises:
   a first transmission member operably engaged with the second rail;
   a second motor disposed on the first rail and configured to drive the first transmission member to move the second rail relative to the first rail along the second axial direction;
   a second transmission member operably engaged with the printing nozzle; and
   a third motor disposed on the second rail and configured to drive the second transmission member to move the printing nozzle relative to the second rail along the third axial direction.

8. The adjustable printing-height three-dimensional printer of claim 7, wherein the first transmission member and the second transmission member are transmission belts.

9. The adjustable printing-height three-dimensional printer of claim 5, wherein any two of the first axial direction, the second axial direction, and the third axial direction are perpendicular to each other.

10. A method for adjusting printing-height of an adjustable printing-height three-dimensional printer comprising a base; an elevating platform; a working platform; a printing nozzle; an elevating shaft; a first driving module; and a second driving module, the elevating platform being disposed on the base and configured to be movable towards or away from the base, the working platform being disposed on the elevating platform and configured to be movable towards or away from the elevating platform, the printing nozzle being located above the working platform and configured to print on the working platform, the elevating shaft being connected to the base, the first driving module being operably engaged with the elevating shaft and the elevating platform, configured to drive the elevating shaft to move the base along a first axial direction, and further configured to drive the elevating platform to move relative to the base along the first axial direction; the second driving module being connected to the elevating platform, operably engaged with the working platform and configured to move the working platform between the printing nozzle and the elevating platform, the method including:
   driving the elevating shaft to move the base along the first axial direction for a predetermined distance; and
   simultaneously driving the elevating platform to move in an opposite direction to the base movement along the first axial direction for the predetermined distance.

* * * * *